United States Patent
Stent et al.

(10) Patent No.: US 12,162,507 B2
(45) Date of Patent: Dec. 10, 2024

(54) VEHICLE-PROVIDED RECOMMENDATIONS FOR USE OF ADAS SYSTEMS

(71) Applicant: TOYOTA RESEARCH INSTITUTE, INC., Los Altos, CA (US)

(72) Inventors: Simon A. I. Stent, Cambridge, MA (US); Guy Rosman, Newton, MA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 284 days.

(21) Appl. No.: 17/688,244

(22) Filed: Mar. 7, 2022

(65) Prior Publication Data

US 2023/0278572 A1    Sep. 7, 2023

(51) Int. Cl.
*B60W 50/14*  (2020.01)
*B60W 60/00*  (2020.01)

(52) U.S. Cl.
CPC .......... *B60W 50/14* (2013.01); *B60W 60/005* (2020.02); *B60W 2050/146* (2013.01); *B60W 2520/10* (2013.01); *B60W 2540/22* (2013.01); *B60W 2540/225* (2020.02); *B60W 2540/30* (2013.01); *B60W 2556/10* (2020.02)

(58) Field of Classification Search
CPC .......... B60W 50/14; B60W 2050/146; B60W 60/005; B60W 2520/10; B60W 2540/22; B60W 2540/225; B60W 2540/30; B60W 2540/221; B60W 2540/229; B60W 50/0098; B60W 50/10
See application file for complete search history.

(56) References Cited

U.S. PATENT DOCUMENTS

| | | | | |
|---|---|---|---|---|
| 11,842,300 | B1* | 12/2023 | Gaudin | G07C 5/085 |
| 2011/0245992 | A1* | 10/2011 | Stahlin | B60W 50/085 |
| | | | | 701/1 |
| 2012/0212353 | A1* | 8/2012 | Fung | G08G 1/167 |
| | | | | 701/1 |

(Continued)

FOREIGN PATENT DOCUMENTS

| | | |
|---|---|---|
| DE | 102009045760 A1 | 4/2010 |
| WO | 2021040708 | 3/2021 |
| WO | 2021159913 A1 | 8/2021 |

OTHER PUBLICATIONS

M. Hasenjäger and H. Wersing, "Personalization in advanced driver assistance systems and autonomous vehicles: A review," 2017 IEEE 20th International Conference on Intelligent Transportation Systems (ITSC), Yokohama, Japan, 2017, pp. 1-7. (Year: 2017).*

(Continued)

*Primary Examiner* — Dino Kujundzic
(74) *Attorney, Agent, or Firm* — SHEPPARD, MULLIN, RICHTER & HAMPTON LLP; Daniel N. Yannuzzi

(57) ABSTRACT

Systems and methods are provided for an advanced driver-assistance system (ADAS) that obtains data from a plurality of sensors. In some embodiments, the system can retrieve data regarding a user's past interactions and analyze the data with the sensor data to determine the user's behavior. In some embodiments, the ADAS can determine whether a user is unaware of an ADAS feature based on this behavior and a prompt that recommends the ADAS feature. The user's response to this prompt may be incorporated into the user's behavior for future recommendations.

32 Claims, 6 Drawing Sheets

(56) References Cited

U.S. PATENT DOCUMENTS

| | | | |
|---|---|---|---|
| 2015/0191122 A1* | 7/2015 | Roy | G08G 1/096827 |
| | | | 340/439 |
| 2017/0113664 A1 | 4/2017 | Nix | |
| 2017/0267252 A1 | 9/2017 | Park | |
| 2018/0194365 A1* | 7/2018 | Bae | G08G 1/16 |
| 2019/0106106 A1 | 4/2019 | Hanna | |
| 2020/0005060 A1 | 1/2020 | Martin | |
| 2020/0139992 A1 | 5/2020 | Oba | |
| 2020/0169789 A1* | 5/2020 | Kim | H04N 21/45 |
| 2023/0174074 A1* | 6/2023 | Choi | B60W 40/09 |

OTHER PUBLICATIONS

Yannis Lilis et al., "Personalizing HMI Elements in ADAS Using Ontology Meta-Models and Rule Based Reasoning," Universal Access in Human-Computer Interaction—Design and Development Approaches and Methods, 11th International Conference (UAHCI) 2017, Vancouver, BC, Canada, 2017, pp. 383-401. (Year: 2017).*

A. Ponomarev and A. Chernysheva, "Adaptation and Personalization in Driver Assistance Systems," 2019 24th Conference of Open Innovations Association (FRUCT), Moscow, Russia, 2019, pp. 335-344. (Year: 2019).*

* cited by examiner

VEHICLE-PROVIDED RECOMMENDATIONS FOR USE OF ADAS SYSTEMS

TECHNICAL FIELD

The present disclosure relates generally to autonomous driving, and in particular, some implementations may relate to driving systems that evaluate driver conditions and behaviors to predict optimal autonomous driving.

DESCRIPTION OF RELATED ART

Advanced driver-assistance systems (ADAS) can refer to electronic systems that assist a vehicle operator while driving, parking, or otherwise maneuvering a vehicle. ADAS can increase vehicle and road safety by minimizing human error, and introducing some level of automated vehicle/vehicle feature control. Fully autonomous driving systems may go further than ADAS by leaving responsibility of maneuvering and controlling a vehicle to the autonomous driving systems. For example, an autonomous driving system may comprise some package or combination of sensors to perceive a vehicle's surroundings, advanced control systems that interpret the sensory information to identify appropriate navigation paths, obstacles, road signage, etc., and control the vehicle to effectuate movement in accordance with the appropriate navigation paths.

BRIEF SUMMARY OF THE DISCLOSURE

In accordance with one embodiment, a method for effectuating an advanced driver-assistance system (ADAS) of a vehicle may comprise obtaining sensor data from a plurality of sensors; retrieving data on a user's past interactions with the ADAS; determining the user's behavior based on the sensor data and data on past user interactions; and adjusting the ADAS in response to the user's behavior.

In some embodiments, the method further comprises determining whether the user is unaware of the existence of an ADAS feature based on the user's behavior and recommending the ADAS feature to the user if the user is determined to be aware.

In some embodiments, adjusting the ADAS comprises determining whether an ADAS feature is applicable to a situation and recommending the ADAS feature to the user.

In some embodiments, the data on the user's past interactions includes information of each of turn on operations of the ADAS and turn off operations of the ADAS.

In some embodiments, recommending the ADAS feature includes providing a prompt to initiate the ADAS feature and initiating the ADAS feature.

In some embodiments, providing the prompt is completed with a LED display and the LED display provides a shortcut to turn on the recommended ADAS feature.

In some embodiments, the method further comprises determining when the user turned off an ADAS feature; determining whether the ADAS feature was subsequently updated; and notifying the user about the updated ADAS feature.

In some embodiments, determining the user's behavior involves a first user, and further comprises sharing the user behavior with a second user.

In some embodiments, the sensor data includes the user's facial and physical expressions.

In some embodiments, the past user interaction data includes previous recommendations on ADAS features that the user ignored.

In some embodiments, the past user interaction data includes the number of times an ADAS feature was turned off.

In accordance with another embodiment, a vehicle may comprise a processor; a plurality of sensors, and a memory unit operatively connected to the processor and including computer code, that when executed, causes the processor to obtain sensor data from the plurality of sensors; retrieve data on a user's past interactions with an ADAS module; determine the user's behavior based on the sensor data and data on past user interactions; determine whether the user is unaware of an ADAS feature; recommend the ADAS feature to the user on a display by presenting, on the display, a prompt to initiate the ADAS feature; and adjust the ADAS in response to the user's behavior.

In some embodiments, the prompt is a textual message and further comprises an actuation mechanism to initiate the ADAS feature and an actuation mechanism to ignore the prompt In some embodiments, the memory unit includes computer code, that when executed, further causes the processor to determine whether an ADAS feature is applicable to a situation.

In some embodiments, the data on the user's past interactions includes information of each of turn on operations of the ADAS and turn off operations of the ADAS.

In some embodiments, the user's behavior reflects the past interactions of a first user, and the memory unit includes computer code, that when executed, further causes the processor to share the user behavior with a second user.

In some embodiments, the past user interaction data includes previous recommendations on ADAS features that the user ignored, and the memory unit includes computer code, that when executed, further causes the processor to abstain from recommending an ADAS feature if the user previously ignored a recommendation.

In some embodiments, the past user interaction data includes the number of times an ADAS feature was turned off and wherein the memory unit includes computer code, that when executed, further causes the processor to abstain from recommending an ADAS feature if the ADAS feature was turned off one or more times.

In some embodiments, the one or more sensors includes at least one of an eye tracking sensor, speed sensor, facial recognition sensor, and environmental sensor.

In some embodiments, the vehicle further comprises an LED display.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

DETAILED DESCRIPTION

Figure 1:
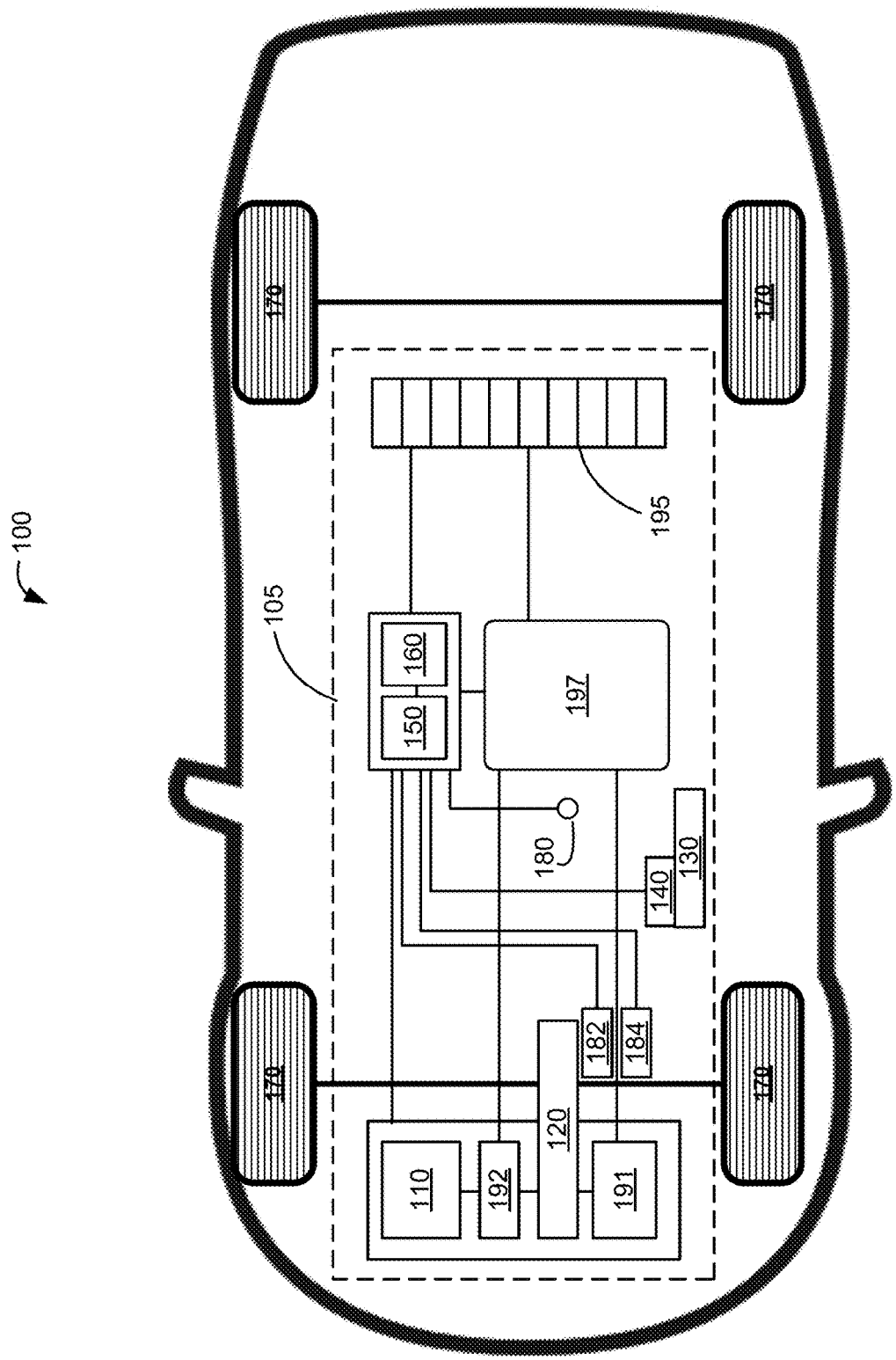
FIG. 1 is a schematic representation of an example vehicle with which embodiments of the systems and methods disclosed herein may be implemented.

As alluded to above, ADAS and autonomous driving control systems can be used in vehicles that at least, in part, control or manage vehicle operation to provide varying levels of automated control or assistance, and may or may not actually influence/affect driving dynamics. For ease of reference, the term "autonomous control" will be used herein to refer to such systems. In some vehicles, an override mechanism, such as an override switch, may be used to turn off or disengage a vehicle's autonomous control system. Such an override mechanism can allow a driver/operator or passenger to assume manual control of a vehicle. When invoking conventional implementations of override mechanisms in a safety scenario (e.g., to avoid a collision), a vehicle operator engages in a human/manual situational assessment, and may intervene/override autonomous control by manually actuating a driving control mechanism, such as grasping and controlling a steering wheel, actuating a brake pedal, actuating a throttle pedal, and so on. In some vehicles, ADAS provide warning alerts or notifications to a driver, where these alerts/notifications are intended to invoke some reaction or response from the driver to, e.g., correct a current driving behavior.

It should be understood that the current (and a least a portion of a future) state of vehicular autonomous control may fall under what can be referred to as a transition period prior to the realization of fully autonomous driving. Thus, a human operator, i.e., a driver of a vehicle, may still inject some amount of control and/or may be prompted to take certain action(s), e.g., in response to some road or vehicle operating condition as alluded to above. In particular, such influential control may act as an intuitive reinforcement of some action(s) being promulgated by a vehicle ADAS, e.g., so that the driver of the vehicle may understand and appreciate the autonomous control being effectuated over the vehicle. In some embodiments, such influential control, alternatively, or in addition to the aforementioned reinforcement, may act to induce or prompt the driver to impart some complementary action(s) to existing ADAS-initiated control of the vehicle, or even in response to current driver-initiated control of the vehicle. In the event the driver's current action(s) do not comport with ADAS-effectuated control (or if the driver's current action(s) should be enhanced or augmented with additional action(s)/greater level of action(s)), such influential control can make the driver aware that his/her action(s) differ from the ADAS-effectuated control and/or intervene to induce or prompt the driver to stop his/her non-conforming action(s)/behavior(s).

In some current ADASs, a torque may be applied, by/under the control of the ADAS system, to the steering wheel so that actual steering can be influenced. That is, in some scenarios, the actual driving dynamics of a vehicle can be affected by this ADAS feature.

In contrast, some embodiments of the present disclosure do not directly influence the driving dynamics of a vehicle. Rather, some embodiments result in providing a recommendation that the driver understands, but one that the driver can choose to ignore if desired. Embodiments can be especially helpful in situations where an ADAS may make a recommendation for an action to be undertaken by the driver, but the ADAS may not be very confident with the recommendation. Moreover, use of various embodiments avoids driver skill degradation/degeneration. That is, because some embodiments provide recommendations/influential cues/control only, the driver is not actually relieved from manual/mechanical control, and the driver's driving skills can be maintained rather than lost (as might be the case over time/with fully autonomous vehicles). For example, a prompt may appear on a display asking if a driver would like to initiate cruise control. If the driver is in a high traffic area, cruise control may not be optimal as a high traffic area does not allow for a consistent speed, so the driver may choose to ignore the prompt. By using a display with a shortcut to the ADAS feature, the driver still maintains full control and initiates any ADAS features.

As further described below, some embodiments provide recommendations based on the past and current actions of the driver. Some embodiments can develop a driver profile that includes the driver's characteristics and tendencies while driving. This profile fuels recommendations made to the driver and may evolve over time, and in some embodiments, that evolution may constantly occur. As the driver completes more trips, the profile can be updated to reflect more accurate characteristics. The system may also take into account how the driver reacts to recommendations and prompts. A successful prompt, i.e. wherein the user accepts the prompt to initiate the recommended ADAS feature, can train the system to accurately determine when a recommendation is appropriate and likely successful. The system can build upon the common characteristics of previous drivers as a starting point, and narrow its scope upon further experience with a particular driver. This system can be individually implemented for multiple drivers that use the vehicle. In that case, the system will maintain separate profiles and can train separate models for each driver.

The systems and methods disclosed herein may be implemented with or by any of a number of different vehicles and vehicle types. For example, the systems and methods disclosed herein may be used with automobiles, trucks, motorcycles, recreational vehicles and other like on- or off-road vehicles. In addition, the principles disclosed herein may also extend to other vehicle types as well. An example hybrid electric vehicle is illustrated and described below as one example.

FIG. 1 illustrates an example hybrid electric vehicle (HEV) 100 in which various embodiments for driver disengagement of autonomous vehicle/driving controls may be implemented. It should be understood that various embodiments disclosed herein may be applicable to/used in various vehicles (internal combustion engine (ICE) vehicles, fully electric vehicles (EVs), etc.) that are fully or partially autonomously controlled/operated, not only HEVs.

HEV 100 can include drive force unit 105 and wheels 170. Drive force unit 105 may include an engine 110, motor generators (MGs) 191 and 192, a battery 195, an inverter 197, a brake pedal 130, a brake pedal sensor 140, a transmission 120, a memory 160, an electronic control unit (ECU) 150, a shifter 180, a speed sensor 182, and an accelerometer 184.

Engine 110 primarily drives the wheels 170. Engine 110 can be an ICE that combusts fuel, such as gasoline, ethanol, diesel, biofuel, or other types of fuels which are suitable for combustion. The torque output by engine 110 is received by the transmission 120. MGs 191 and 192 can also output torque to the transmission 120. Engine 110 and MGs 191 and 192 may be coupled through a planetary gear (not shown in FIG. 1B). The transmission 120 delivers an applied torque to the wheels 170. The torque output by engine 110 does not directly translate into the applied torque to the wheels 170.

MGs 191 and 192 can serve as motors which output torque in a drive mode, and can serve as generators to recharge the battery 195 in a regeneration mode. The electric power delivered from or to MGs 191 and 192 passes through inverter 197 to battery 195. Brake pedal sensor 140 can detect pressure applied to brake pedal 130, which may further affect the applied torque to wheels 170. Speed sensor 182 is connected to an output shaft of transmission 120 to detect a speed input which is converted into a vehicle speed by ECU 150. Accelerometer 184 is connected to the body of HEV 100 to detect the actual deceleration of HEV 100, which corresponds to a deceleration torque.

Transmission 120 is a transmission suitable for an HEV. For example, transmission 120 can be an electronically controlled continuously variable transmission (ECVT), which is coupled to engine 110 as well as to MGs 191 and 192. Transmission 120 can deliver torque output from a combination of engine 110 and MGs 191 and 192. The ECU 150 controls the transmission 120, utilizing data stored in memory 160 to determine the applied torque delivered to the wheels 170. For example, ECU 150 may determine that at a certain vehicle speed, engine 110 should provide a fraction of the applied torque to the wheels while MG 191 provides most of the applied torque. ECU 150 and transmission 120 can control an engine speed (NE) of engine 110 independently of the vehicle speed (V).

ECU 150 may include circuitry to control the above aspects of vehicle operation. ECU 150 may include, for example, a microcomputer that includes one or more processing units (e.g., microprocessors), memory storage (e.g., RAM, ROM, etc.), and I/O devices. ECU 150 may execute instructions stored in memory to control one or more electrical systems or subsystems in the vehicle. ECU 150 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., anti-lock braking system (ABS) or electronic stability control (ESC)), battery management systems, and so on. These various control units can be implemented using two or more separate electronic control units, or using a single electronic control unit.

MGs 191 and 192 each may be a permanent magnet type synchronous motor including for example, a rotor with a permanent magnet embedded therein. MGs 191 and 192 may each be driven by an inverter controlled by a control signal from ECU 150 so as to convert direct current (DC) power from battery 195 to alternating current (AC) power, and supply the AC power to MGs 191, 192. MG 192 may be driven by electric power generated by motor generator MG191. It should be understood that in embodiments where MG191 and MG192 are DC motors, no inverter is required. The inverter, in conjunction with a converter assembly may also accept power from one or more of MGs 191, 192 (e.g., during engine charging), convert this power from AC back to DC, and use this power to charge battery 195 (hence the name, motor generator). ECU 150 may control the inverter, adjust driving current supplied to MG 192, and adjust the current received from MG191 during regenerative coasting and braking.

Battery 195 may be implemented as one or more batteries or other power storage devices including, for example, lead-acid batteries, lithium ion, and nickel batteries, capacitive storage devices, and so on. Battery 195 may also be charged by one or more of MGs 191, 192, such as, for example, by regenerative braking or by coasting during which one or more of MGs 191, 192 operates as generator. Alternatively (or additionally), battery 195 can be charged by MG 191, for example, when HEV 100 is in idle (not moving/not in drive). Further still, battery 195 may be charged by a battery charger (not shown) that receives energy from engine 110. The battery charger may be switched or otherwise controlled to engage/disengage it with battery 195. For example, an alternator or generator may be coupled directly or indirectly to a drive shaft of engine 110 to generate an electrical current as a result of the operation of engine 110. Still other embodiments contemplate the use of one or more additional motor generators to power the rear wheels of a vehicle (e.g., in vehicles equipped with 4-Wheel Drive), or using two rear motor generators, each powering a rear wheel.

Battery 195 may also be used to power other electrical or electronic systems in the vehicle. Battery 195 can include, for example, one or more batteries, capacitive storage units, or other storage reservoirs suitable for storing electrical energy that can be used to power MG 191 and/or MG 192. When battery 195 is implemented using one or more batteries, the batteries can include, for example, nickel metal hydride batteries, lithium ion batteries, lead acid batteries, nickel cadmium batteries, lithium ion polymer batteries, and other types of batteries.

Figure 2A:
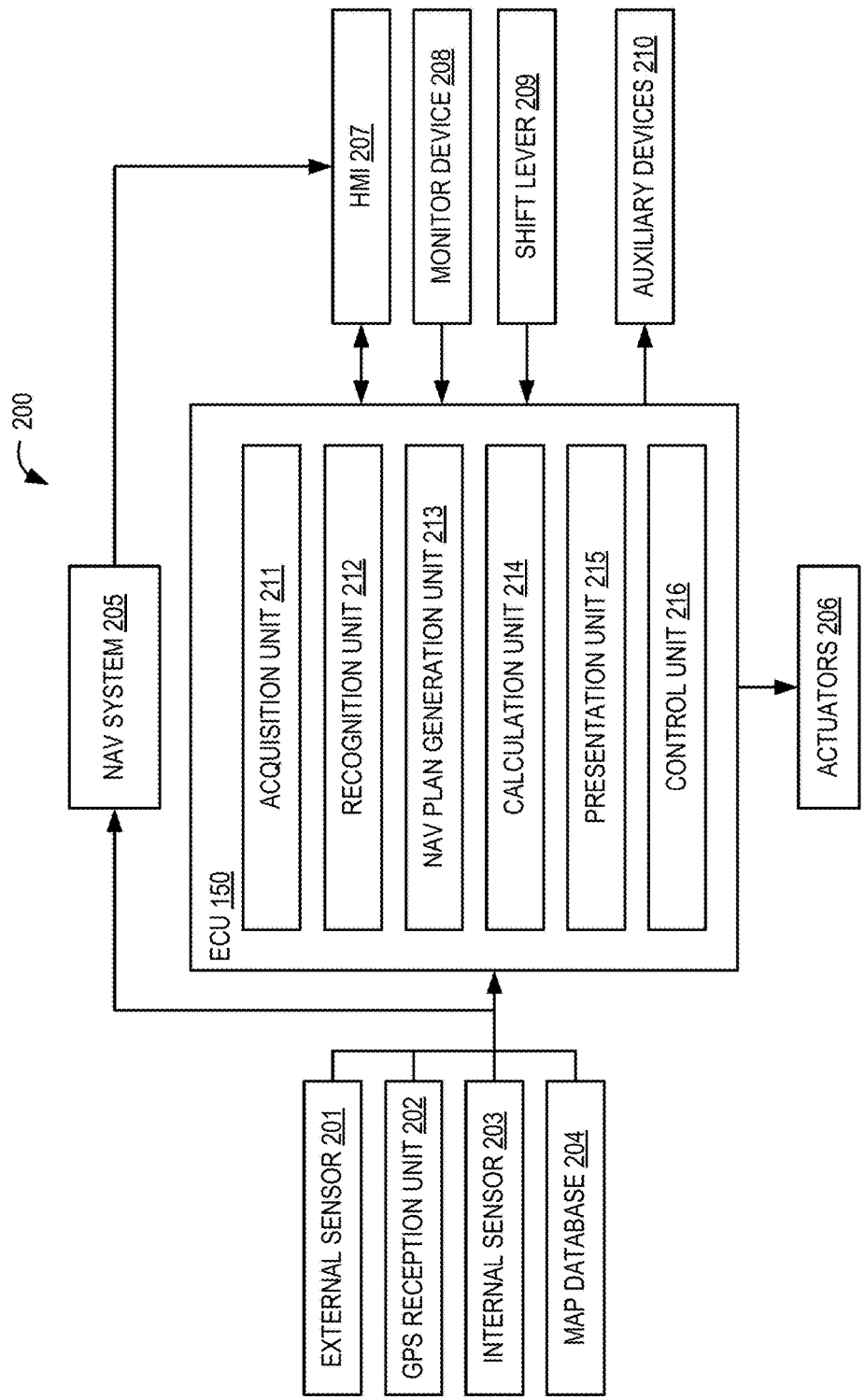
FIG. 2A illustrates an example autonomous control system.

FIG. 2A illustrates an example autonomous control system 200 that may be used to autonomously control a vehicle, e.g., HEV 100. Autonomous control system 200 may be installed in HEV 100, and executes autonomous control of HEV 100. As described herein, autonomous control can refer to control that executes driving/assistive driving operations such as acceleration, deceleration, and/or steering of a vehicle, general movement of the vehicle, without necessarily depending or relying on driving operations/directions by a driver or operator of the vehicle.

As an example, autonomous control may include lane keeping assist control where a steering wheel (not shown) is steered automatically (namely, without depending on a steering operation by the driver) such that HEV 100 does not depart from a running lane. That is, the steering wheel is automatically operated/controlled such that HEV 100 runs along the running lane, even when the driver does not perform any steering operation. As alluded to above, other autonomous control may include assistive driving mechanisms in the form of, e.g., visual or audible alerts or warnings, indirect haptic feedback, such as vibrating the driver's seat, etc.

As another example, autonomous control may include navigation control, where when there is no preceding vehicle in front of the HEV 100, constant speed (cruise) control is effectuated to make HEV 100 run at a determined constant speed. When there is a preceding vehicle in front of HEV 100, follow-up control is effectuated to adjust HEV 100's speed according to a distance between HEV 100 and the preceding vehicle.

In some scenarios, switching from autonomous control to manual driving may be executed. Whether or not to execute this switch from autonomous control to manual driving may be determined based on a comparison between a comparison target and a threshold. In one embodiment, the comparison target is quantified so as to be compared with the threshold. When the comparison target is equal to or more than the threshold, the autonomous control system 200 executes the switch from an autonomous control mode to a manual driving mode. In other situations/scenarios, autonomous control system 200 may take over operation, effecting a switch from manual driving/control to autonomous control. As will be discussed in greater detail below, autonomous control system 200 may make certain determinations regarding whether to comply or proceed with autonomous control based on a command from autonomous control system 200. For example, considerations regarding recoverability and vehicle control under certain conditions may be considered as factors in determining whether or not autonomous control can be safely executed. Such considerations may also be reflected as thresholds for comparison.

For example, when an operation amount of any of a steering operation, an acceleration operation, and brake operation by the driver of HEV 100 during the autonomous driving control becomes equal to or more than a threshold, autonomous control system 200 may execute a switch from autonomous control to manual control.

It should be understood that manual control or manual driving can refer to a vehicle operating status wherein a vehicle's operation is based mainly on driver-controlled operations/maneuvers. In an ADAS context, driving operation support control can be performed during manual driving. For example, a driver may be actively performing any of a steering operation, an acceleration operation, and a brake operation of the vehicle, while autonomous control apparatus 200 performs some subset of one or more of those operations, e.g., in an assistive, complementary, or corrective manner. As another example, driving operation support control adds or subtracts an operation amount to or from the operation amount of the manual driving (steering, acceleration, or deceleration) that is performed by the driver. It should be understood that in such scenarios, use of influential control over a driver's steering hand(s), because a driver is already engaging in a "proper" operation, may enforce or positively reinforce the driver's action(s).

In the example shown in FIG. 2A, autonomous control system 200 is provided with an external sensor 201, a GPS (Global Positioning System) reception unit 202, an internal sensor 203, a map database 204, a navigation system 205, actuators 206, an HMI (Human Machine Interface) 207, a monitor device 208, a shift lever 209, auxiliary devices 210. Autonomous control system 200 may communicate with ECU 150, or in some embodiments (may be implemented with its own ECU).

In the example shown in FIG. 2A, external sensor 201 is a detector that detects external circumstances such as surrounding information of HEV 100. The external sensor 201 may include at least one of a camera, a radar, and a Laser Imaging Detection and Ranging (LIDAR) unit.

The camera unit may be an imaging device that images the external circumstances surrounding the vehicle. For example, the camera is provided on a back side of a front windshield of the vehicle. The camera may be a monocular camera or a stereo camera. The camera outputs, to the ECU 150, image information on the external circumstances surrounding the vehicle. The camera is not limited to a visible light wavelength camera but can be an infrared camera.

The radar unit uses radio waves to detect obstacles outside of the vehicle by transmitting radio waves to the surroundings of the vehicle, and receiving reflected radio waves from an obstacle to detect the obstacle, distance to the obstacle or a relative positional direction of the obstacle. The radar unit outputs detected obstacle information to the ECU 150.

The LIDAR unit may operate similar to the manner in which the radar unit operates except that light is used in place of radio waves. The LIDAR unit outputs detected obstacle information to the ECU 150.

In the example shown in FIG. 2A, GPS reception unit 202 receives signals from three or more GPS satellites to obtain position information indicating a position of HEV 100. For example, the position information can include latitude information and longitude information. The GPS reception unit 202 outputs the measured position information of the vehicle to the ECU 150.

In the example shown in FIG. 2A, the internal sensor 203 is a detector for detecting information regarding, e.g., a running status of HEV 100, operational/operating conditions, e.g., amount of steering wheel actuation, rotation, angle, amount of acceleration, accelerator pedal depression, brake operation by the driver of HEV 100. The internal sensor 203 includes at least one of a vehicle speed sensor, an acceleration sensor, and a yaw rate sensor. Moreover, internal sensor 203 may include at least one of a steering sensor, an accelerator pedal sensor, and a brake pedal sensor.

A vehicle speed sensor is a detector that detects a speed of the HEV 100. In some embodiments, HEV 100's speed may be measured directly or through calculations/inference depending on the operating conditions/status of one or more other components of HEV 100. For example, a wheel speed sensor can be used as the vehicle speed sensor to detect a rotational speed of the wheel, which can be outputted to ECU 150.

The acceleration sensor can be a detector that detects an acceleration of the vehicle. For example, the acceleration sensor may include a longitudinal acceleration sensor for detecting a longitudinal acceleration of HEV 100, and a lateral acceleration sensor for detecting a lateral acceleration of HEV 100. The acceleration sensor outputs, to the ECU 150, acceleration information.

The yaw rate sensor can be a detector that detects a yaw rate (rotation angular velocity) around a vertical axis passing through the center of gravity of HEV 100. For example, a gyroscopic sensor is used as the yaw rate sensor. The yaw rate sensor outputs, to the ECU 150, yaw rate information including the yaw rate of HEV 100.

The steering sensor may be a detector that detects an amount of a steering operation/actuation with respect to a steering wheel 30 by the driver of HEV 100. The steering operation amount detected by the steering sensor may be a steering angle of the steering wheel or a steering torque applied to the steering wheel, for example. The steering sensor outputs, to the ECU 150, information including the steering angle of the steering wheel or the steering torque applied to the steering wheel of HEV 100.

The accelerator pedal sensor may be a detector that detects a stroke amount of an accelerator pedal, for example, a pedal position of the accelerator pedal with respect to a reference position. The reference position may be a fixed position or a variable position depending on a determined parameter. The accelerator pedal sensor is provided to a shaft portion of the accelerator pedal AP of the vehicle, for example. The accelerator pedal sensor outputs, to the ECU 150, operation information reflecting the stroke amount of the accelerator pedal.

The brake pedal sensor may be a detector that detects a stroke amount of a brake pedal, for example, a pedal position of the brake pedal with respect to a reference position. Like the accelerator position, a brake pedal reference position may be a fixed position or a variable position depending on a determined parameter. The brake pedal sensor may detect an operation force of the brake pedal (e.g. force on the brake pedal, oil pressure of a master cylinder, and so on). The brake pedal sensor outputs, to the ECU 150, operation information reflecting the stroke amount or the operation force of the brake pedal.

A map database 204 may be a database including map information. The map database 204 is implemented, for example, in a disk drive or other memory installed in HEV 100. The map information may include road position information, road shape information, intersection position information, and fork position information, for example. The road shape information may include information regarding a road type such as a curve and a straight line, and a curvature angle of the curve. When autonomous control system 200 uses a Simultaneous Localization and Mapping (SLAM) technology or position information of blocking structural objects such as buildings and walls, the map information may further include an output signal from external sensor 201. In some embodiments, map database 204 may be a remote data base or repository with which HEV 100 communicates.

Navigation system 205 may be a component or series of interoperating components that guides the driver of HEV 100 to a destination on a map designated by the driver of HEV 100. For example, navigation system 205 may calculate a route followed or to be followed by HEV 100, based on the position information of HEV 100 measured by GPS reception unit 202 and map information of map database 204. The route may indicate a running lane of a section(s) of roadway in which HEV 100 traverses, for example. Navigation system 205 calculates a target route from the current position of HEV 100 to the destination, and notifies the driver of the target route through a display, e.g., a display of a head unit, HMI 207 (described below), and/or via audio through a speaker(s) for example. The navigation system 205 outputs, to the ECU 150, information of the target route for HEV 100. In some embodiments, navigation system 205 may use information stored in a remote database, like map database 204, and/or some information processing center with which HEV 100 can communicate. A part of the processing executed by the navigation system 205 may be executed remotely as well.

Actuators 206 may be devices that execute running controls of HEV 100. The actuators 206 may include, for example, a throttle actuator, a brake actuator, and a steering actuator. For example, the throttle actuator controls, in accordance with a control signal output from the ECU 150, an amount by which to open the throttle of HEV 100 to control a driving force (the engine) of HEV 100. In another example, actuators 206 may include one or more of MGs 191 and 192, where a control signal is supplied from the ECU 150 to MGs 191 and/or 192 to output motive force/energy. The brake actuator controls, in accordance with a control signal output from the ECU 150, the amount of braking force to be applied to each wheel of the vehicle, for example, by a hydraulic brake system. The steering actuator controls, in accordance with a control signal output from the ECU 150, driving an assist motor of an electric power steering system that controls steering torque.

HMI 207 may be an interface used for communicating information between a passenger(s) (including the operator) of HEV 100 and autonomous control system 200. For example, the HMI 207 may include a display panel for displaying image information for the passenger(s), a speaker for outputting audio information, and actuation mechanisms, such as buttons or a touch panel used by the occupant for performing an input operation. HMI 207 may also or alternatively transmit the information to the passenger(s) through a mobile information terminal connected wirelessly and receive the input operation by the passenger(s) through the mobile information terminal.

Monitor device 208 monitors a status of the driver/operator. The monitor device 208 can check a manual driving preparation state of the driver. More specifically, the monitor device 208 can check, for example, whether or not the driver is ready to start manual operation of HEV 100. Moreover, the monitor device 208 can check, for example, whether or not the driver has some intention of switching HEV 100 to a manual mode of operation.

For example, the monitor device 208 may be a camera that can take an image of the driver, where the image can be used for estimating the degree to which the driver's eyes are open, the direction of the driver's gaze, whether or not the driver is holding the steering wheel, etc. Monitor device 208 may also be a pressure sensor for detecting the amount of pressure the driver's hand(s) are applying to the steering wheel. As another example, the monitor device 208 can be a camera that takes an image of a hand of the driver.

A shift lever 209 can be positioned at a shift position, e.g., "A (AUTOMATIC)," "D (DRIVE)," etc. The shift position "A" indicates, for example, an automatic engage mode where autonomous control is engaged automatically. The shift position "D" indicates a triggered engage mode where autonomous control is engaged in response to a driver-initiated request to operate HEV 100 in an autonomous driving mode.

Auxiliary devices 210 may include devices that can be operated by the driver of the vehicle, but are not necessarily drive-related, such as actuators 206. For example, auxiliary devices 210 may include a direction indicator, a headlight, a windshield wiper and the like.

ECU 150 may execute autonomous control of the vehicle, and may include an acquisition unit 211, a recognition unit 212, a navigation plan generation unit 213, a calculation unit 214, a presentation unit 215, and a control unit 216.

Acquisition unit 211 may obtain the following operation amounts or levels of actuation based on the information obtained by the internal sensor 203: steering operation, acceleration operation, and brake operation by the driver during an autonomous control mode; and the level of steering operation, acceleration operation, and brake operation by the driver of the vehicle during a manual control mode.

Recognition unit 212 may recognize or assess the environment surrounding or neighboring HEV 100 based on the information obtained by the external sensor 201, the GPS reception unit 202, and/or the map database 204. For example, the recognition unit 212 includes an obstacle recognition unit (not shown), a road width recognition unit (not shown), and a facility recognition unit (not shown). The obstacle recognition unit recognizes, based on the information obtained by the external sensor 201, obstacles surrounding the vehicle. For example, the obstacles recognized by the obstacle recognition unit include moving objects such as pedestrians, other vehicles, motorcycles, and bicycles and stationary objects such as a road lane boundary (white line, yellow line), a curb, a guard rail, poles, a median strip, buildings and trees. The obstacle recognition unit obtains information regarding a distance between the obstacle and the vehicle, a position of the obstacle, a direction, a relative velocity, a relative acceleration of the obstacle with respect to the vehicle, and a category and attribution of the obstacle. The category of the obstacle includes a pedestrian, another vehicle, a moving object, and a stationary object. The attribution of the obstacle can refer to a property of the obstacle such as hardness and a shape of the obstacle.

The road width recognition unit recognizes, based on the information obtained by the external sensor 201, the GPS reception unit 202, and/or the map database 204, a road width of a road in which the vehicle is running.

The facility recognition unit recognizes, based on the map information obtained from the map database 204 and/or the vehicle position information obtained by the GPS reception unit 202, whether or not HEV 100 is operating/being driven through an intersection, in a parking structure, etc. The facility recognition unit may recognize, based on the map information and the vehicle position information, whether or not the vehicle is running in a school zone, near a childcare facility, near a school, or near a park, etc.

Navigation plan generation unit 213 may generate a navigation plan for HEV 100 based on the target route calculated by the navigation system 205, the information on obstacles surrounding HEV 100 recognized by recognition unit 212, and/or the map information obtained from map database 204. The navigation plan may be reflect one or more operating conditions/controls to effectuate the target route. For example, the navigation plan can include a target speed, a target acceleration, a target deceleration, a target direction, and/or a target steering angle with which HEV 100 should be operated at any point(s) along the target route so that the target route can be achieved to reach a desired destination. It should be understood that navigation plan generation unit 213 generates the navigation plan such that HEV 100 operates along the target route while satisfying one or more criteria and/or constraints, including, for example, safety constraints, legal compliance rules, operating (fuel/energy) efficiency, and the like. Moreover, based on the existence of obstacles surrounding HEV 100, the navigation plan generation unit 213 generates the navigation plan for the vehicle so as to avoid contact with such obstacles.

Calculation unit 214 may calculate a threshold used for determining whether or not to switch from autonomous control to manual driving or vice versa. The determination can be performed based on the operating levels associated with the manner in which the driver is operating HEV 100 during autonomous control which is obtained by the acquisition unit 211. For example, the driver of HEV 100 may suddenly grasp the steering wheel (which can be sensed by internal sensor 203) and stomp on the brake pedal (which can be sensed by monitor device 208). The pressure on the steering wheel and the level of actuation of the brake pedal may be excessive enough (exceed a threshold) suggesting that the driver intends to override the autonomous control system 200.

Presentation unit 215 displays, on a display of the HMI 207, a threshold which is calculated by the calculation unit 214 and used for determining whether or not to execute the switching from autonomous control to the manual driving or vice versa.

Control unit 216 can autonomously control HEV 100 based on the navigation plan generated by navigation plan generation unit 213. The control unit 216 outputs, to the actuators 206, control signals according to the navigation plan. That is, the control unit 216 controls actuators 206 based on the navigation plan, and thereby autonomous control of HEV 100 is executed/achieved. Moreover, certain levels of operation, e.g., steering wheel actuation, by the driver can be detected by the acquisition unit 211. When such level(s) equal or exceed the threshold calculated by the calculation unit 214 in a period during which autonomous control is being used to operate HEV 100, control unit 216 executes a switching from autonomous control to manual control.

Figure 2B:
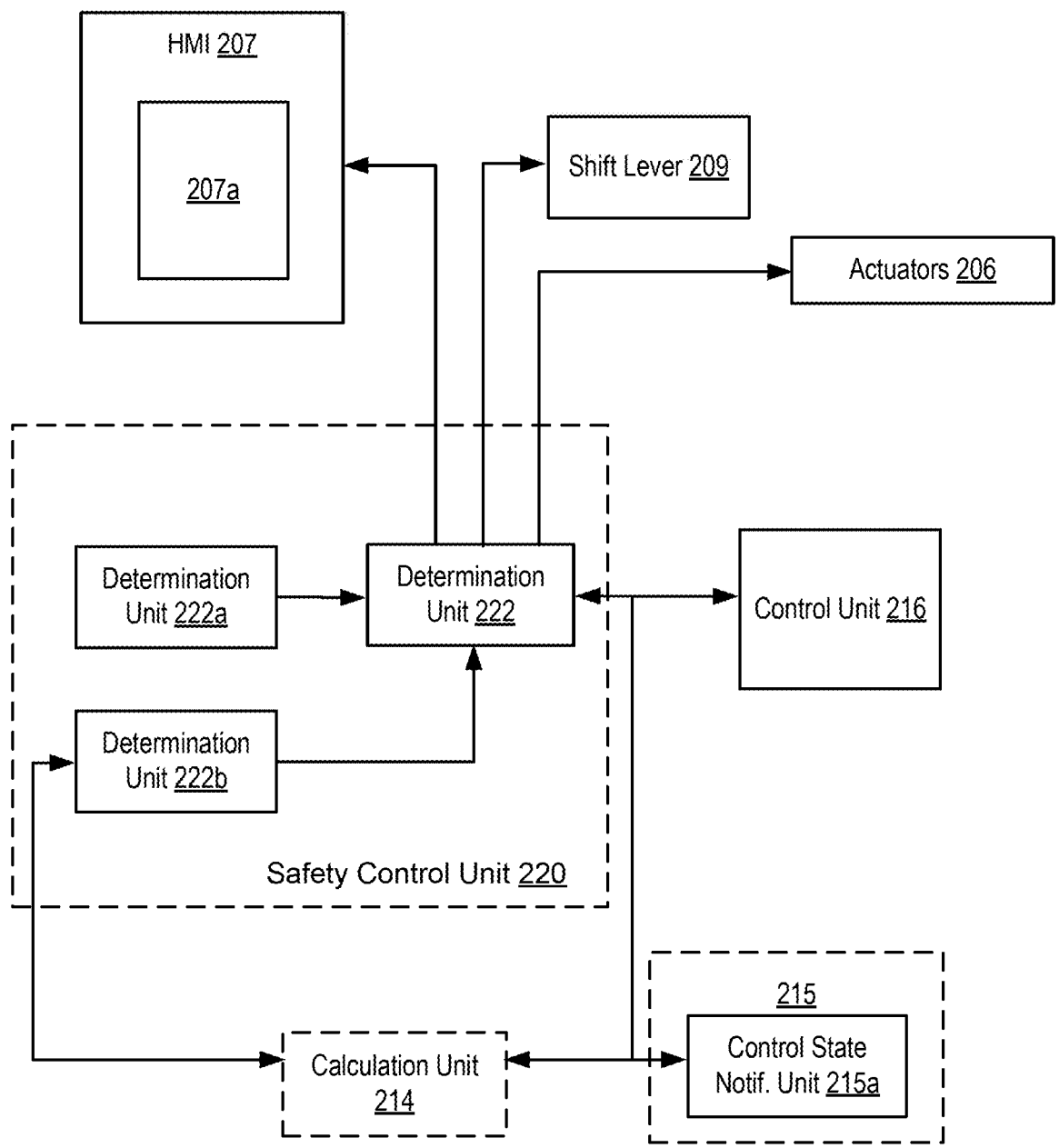
FIG. 2B illustrates an example safety control unit aspect of the autonomous control system of FIG. 2A.

Referring to FIG. 2B, control unit 216 operatively interacts with safety control unit 220 that determines whether or not autonomous control system 200 (in particular, control unit 216) can engage (activate, start) in autonomous control of HEV 100. For example, safety control unit 220 may include one or more determination units, e.g., determination unit 222a determines whether or not autonomous control can be engaged, based on a difference between a vehicle position calculated from signals received by the GPS reception unit 202 and an actual vehicle position calculated based on an output signal from the external sensor 201, the map information of the map database 204 and so forth. For example, a threshold condition associated with engagement of autonomous control in HEV 100 may be predicated on travel along a certain type of roadway, e.g., known segment(s) of road within map database 204, such as a freeway (versus) country lane. Road curvature may be another condition/characteristic on which autonomous control of HEV 100 may be based. Determination unit 222a may make its determination based on one or more determinative factors.

Control unit 216 may further interact with a determination unit 222b of safety control unit 220 that determines whether or not a trigger to deactivate (stop) an autonomous control mode exists. For example, determination unit 222b can determine whether or not to execute the switch from the autonomous control to manual control based on the level of steering wheel actuation, brake pedal actuation, etc. effectuated by the driver while HEV 100 is being operated in an autonomous control mode, which is obtained by the acquisition unit 211. Other determinative factors or considerations may be the amount of acceleration or deceleration experienced by HEV 100, also determined by acquisition unit 211. When determination unit 222 determines that the autonomous control can be engaged, based on the determinations performed by determination units 222a and/or 222b, control unit 216 engages autonomous control of HEV 100. That is, determination unit 222 may act as a determination aggregator that aggregates determinations rendered by other determination units. Determination unit 222 may be a circuit, e.g., application-specific integrated circuit, logic, software, or some combination thereof that processes the individual determinations rendered by the other determination units (e.g., determination units 222a and 222b) to render an overall determination. That overall determination may control operation of control unit 216, e.g., to disengage autonomous control and switch to manual control or engage in autonomous control.

On the other hand, when determination units 222a and/or 222b determine that a switch from autonomous control to the manual control should be executed, autonomous control is deactivated/disengaged by control unit 216 or control unit 216 is itself deactivated/disengaged, and the driver proceeds to manually control HEV 100. It should be understood that other determination units may be used (or only a single determination unit may be used). In the case of multiple determination units being used, in some embodiments, any single determination that manual control should be executed can serve as a trigger to deactivate autonomous control. In some embodiments, presentation unit 215 is provided with a control state notification unit 215a that notifies the driver of a fact that HEV 100 is operating under autonomous control is in execution, and so forth. Such a notification may be displayed on a display of HMI 207, for example. Likewise, If a switch from autonomous control to the manual control is executed, the control state notification unit 215a displays, on the display of HMI 207 a corresponding notification.

HMI 207, in some embodiments, may include an autonomous control engagement trigger input unit 207a that can be actuated by the driver of HEV 100 to engage in an autonomous control mode (after safety control unit 220 determines that autonomous control can be effectuated).

In some embodiments, the driver of HEV 100 may be able to select an automatic autonomous control engage mode, where autonomous control unit 216 can be automatically engaged when safety control unit 220 determines that the autonomous control can be engaged. In some embodiments, shift lever 209 may be used to set a triggered autonomous control mode and an automatic engage mode (as alluded to above by actuating shift lever 209 to an "A" (AUTOMATIC) position or to a "D" (DRIVE) position.

Figure 3:
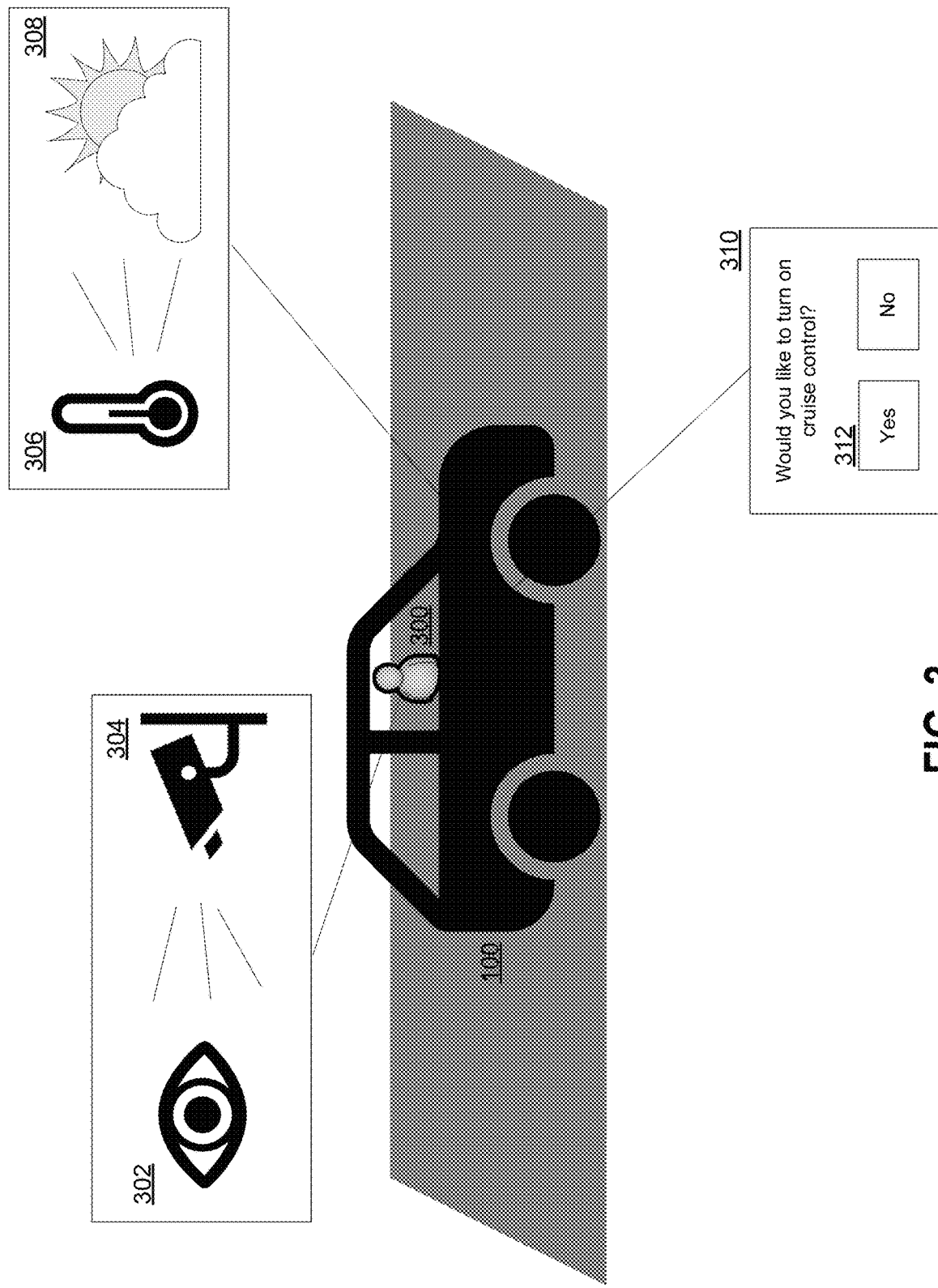
FIG. 3 illustrates an example recommendation made to a driver in accordance with various embodiments.

FIG. 3 illustrates an example embodiment where the ADAS system may recommend a feature. The vehicle gathers data about the driver from multiple sources and sensors. Data may come from sensors located inside and outside the vehicle. These sensors may include, but are not limited to speed and brake sensors, eye sensors, video cameras, shock sensors, or suspension sensors. Data from these sensors can inform the ADAS about various characteristics about the driver, including, but not limited to, fatigue, focus, physical movements, and emotional expressions. In one example, the ADAS may determine that a driver 300 is fatigued based on rapid eye fluttering 302 measured by the video cameras and/or eye trackers 304. In another example, a driver may be losing focus because their body and facial movements are not consistently pointed towards the road. Sensors also measure characteristics of the vehicle and the surrounding environment. These can include, but are not limited to, lane tracking via video cameras, speed profiles (including acceleration and deceleration rates), temperature measurements, and monitoring weather conditions. In FIG. 3, the weather can be measured by a temperature and/or light reading 306 to determine that the weather is generally sunny 308. The ADAS also perceives individual events outside of the normal course of driving. For example, the system may measure the deceleration of the vehicle and determine that the rate exceeds typical braking. Furthermore, the system can pair measured deceleration with data demonstrating that an object is growing closer to the vehicle. In this example, the system can perceive that the vehicle is entering a situation with a risk of collision. These events guide the ADAS toward an appropriate course of action.

Using the events and/or environmental factors, the ADAS determines whether an ADAS feature would be appropriate, meaning that it would improve the safety or efficiency of driving in a given situation. For example, in FIG. 3, on an open highway with a consistent speed and cooperating weather, the system may note that cruise control would be appropriate. The ADAS also pulls data from the driver's past trips, including, but not limited to, histories of using certain ADAS features, average speeds, typical braking speeds, and following distance in between cars. For example, the system may note that the driver usually guides the vehicle to follow another vehicle with fifteen feet of space. This data allows the system to generate a user profile that outlines the driver's behavior.

A driver profile can include multiple generalized characteristics about the driver. For example, if a driver is fatigued after four hours of constant driving, the ADAS may note that the driver typically grows tired after three hours. As another example, the system may note that the driver tends to speed more on the highways than on residential roads. The system may note that the average speeds change depending on the weather conditions, or note that the driver acts more confidently or recklessly in inclement weather. As another example, the ADAS may note that the driver struggles to parallel park, based on the length of time and the amount of turns necessary to sufficiently park the vehicle. The system can the note that the driver is inexperienced with parallel parking. In another example, the driver may maintain a deceleration profile to determine that the driver typically brakes with more force than the average driver. The system can determine whether the driver is at risk for collisions or merely brakes at a closer distance normally. The driver profile allows the ADAS to tailor the system to an individual driver's needs.

These determinations are tied to the driver's use of ADAS features. The system aims to ease a driver's experience based on perceived difficulties in certain environments. Furthermore, the ADAS determines whether a driver is unaware about the existence of an ADAS feature based on the driver behavior. This can be accomplished using machine learning and/or a set of rules. In one example, the system can measure the number of times an ADAS feature could have been used but was not initiated. If that number exceeds a threshold value, the system can determine that the driver is unaware of the feature. In another example, the system can determine that the driver turned off an automatic ADAS feature and chose not to use it in past trips, or has repeatedly turned off an ADAS feature during situations where the feature would be appropriate. In another example, a situation may appear to warrant a collision warning. However, the driver's behavior indicates that the driver typically brakes with more force or at a closer distance from an approaching vehicle. The system can then determine that the driver does not need a recommendation and/or has already chosen not to use a particular ADAS feature. The ADAS is capable of dynamically following a driver's choices in order to determine whether a recommendation would be beneficial.

Once the ADAS determines that the driver is unaware about the existence of a feature, it can produce a prompt that notifies the driver about the ADAS features and allows the driver to initiate any or all of the suggested features. In FIG. 3, one example of a prompt can be a text message on a LED display with a touch screen 310. This display can take the form of any display, including, but not limited to, a touchscreen, standard dashboard, or a panel of actuation mechanisms (e.g. buttons) with an accompanying display for text. If the ADAS chooses to prompt a driver, the text may say "You seem a little tired, would you like to turn on cruise control?" This text may be accompanied by a shortcut 312 that the driver can access via voice control, touchpad, button, or another actuation mechanism to initiate the suggested ADAS feature. The driver may also turn on the ADAS feature based on the standard method through a main console, after which the prompt would disappear. This prompt can also appear at various times during a trip. In the above example, the prompt would appear during a trip at the point where the ADAS feature would be appropriate. In another example, the prompt may appear after the driver has parked and turned off the vehicle. Before turning off the vehicle, a prompt can be displayed, such as "Did you know that automatic braking is turned off? Would you like to turn it on?" The ADAS may even retrieve video information to show the driver specifically when an ADAS feature could have been used during the previous trip. Ultimately, the priority for the ADAS proactively increases driver safety before a hazardous event.

The ADAS may even store information about the driver's behavior to send to a third party. For example, if a minor drives the vehicle, the ADAS can send information to parents if a certain event occurs or as a general update on the minor's driving. This information can be sent through an online account or through an online mailing system. If a collision occurs, the parents would be able to see exactly how the collision happened. Similarly, information could be sent to fleet managers for a company if the company's driver acts inappropriately during an event. The fleet managers could view video footage if the ADAS detects that a driver is intoxicated or fatigued. This information can be sent during the trip as an event occurs or at the end of the business day once a driver has made all necessary stops. The third party receiving this information may receive a summary of the events that occurred during the day, or a list of significant events that are cause for concern. The third party can specify their informational needs and the ADAS can filter the driver's history accordingly.

Figure 4:
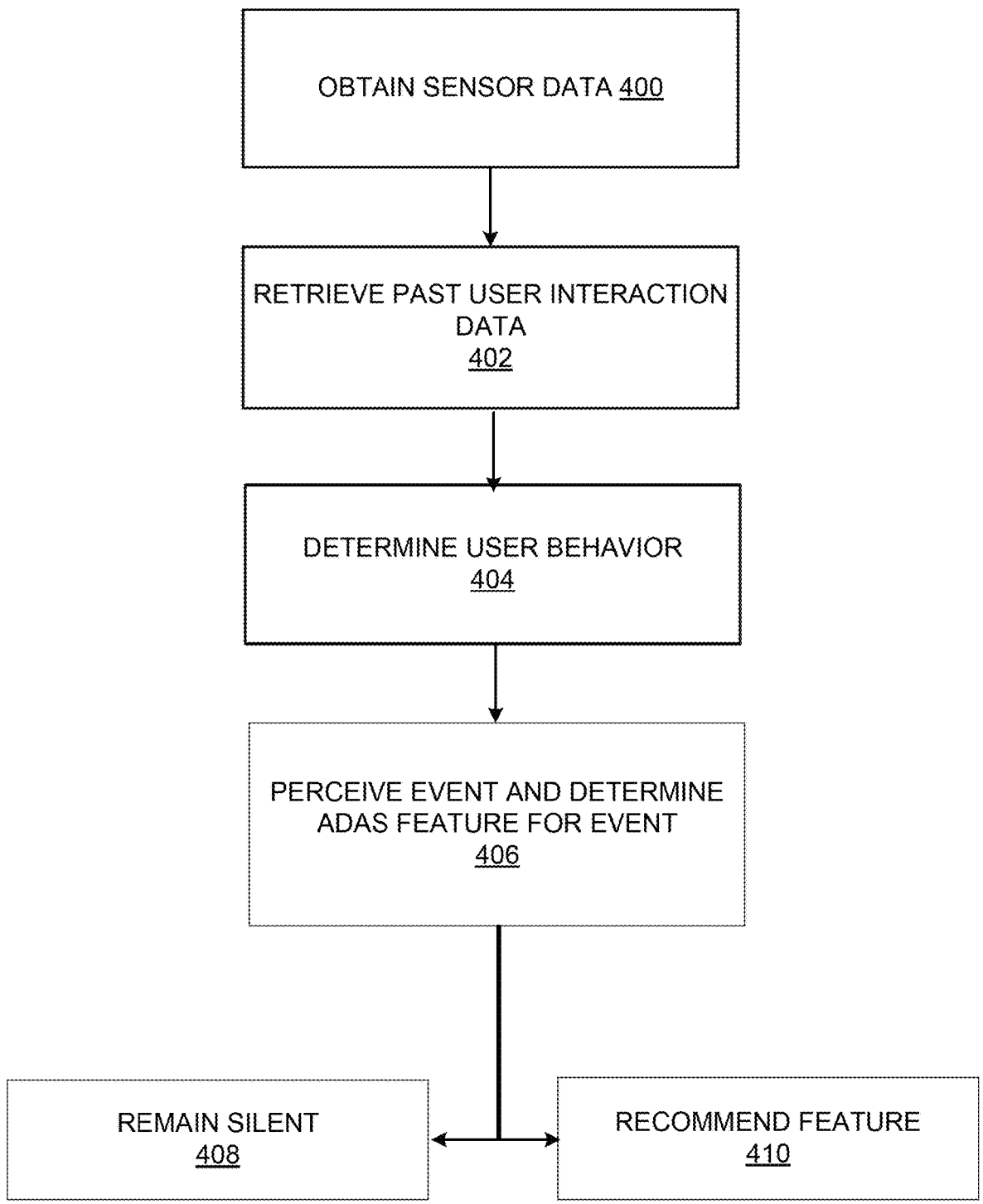
FIG. 4 is a flow chart illustrating operations that may be performed to effectuate influential control in accordance with one embodiment.

FIG. 4 is a flow chart illustrating example operations that may be performed to recommend the ADAS feature. The system obtains sensor data 400 from the vehicle to determine a particular event as well as the conditions surrounding that event for the driver and the vehicle. As discussed above, the sensor data 400 is pooled with the driver's past interaction data 402 to correlate the driver's behavior to a particular event. The system can generally determine the user behavior 404 as well as determine a predicted behavior for a specific event similar or equal to the current driving situation. The system can then perceive the current driving event and determine one or more ADAS features that would be appropriate for the event at block 406. This determination is made in line with data on previous drivers and data from the driver's past interactions. The system then determines whether the ADAS feature should be recommended to the driver. As discussed above, the system may determine that the driver is unlikely to use the ADAS feature, referring to the driver's tendency to turn off the ADAS feature or based on other characteristics of the driver's behavior. Alternatively, the system may determine that while similar to an event where an ADAS feature would be appropriate, for the particular driver or situation, the ADAS feature would not be appropriate. For example, on a highway, cruise control may be appropriate. However, if the particular event includes heavy rain, and the driver's behavior reflects difficulty driving in the rain, cruise control may not be appropriate for the particular driver. In any of the above cases, the ADAS may choose to remain silent at block 408 and not recommend the ADAS feature.

In contrast, the system may determine that an ADAS feature should be recommended at block 410. This can be one or more ADAS features, with each ADAS feature deriving from an individual analysis that the ADAS feature would be appropriate for the situation. As discussed above, a recommendation can occur because the driver is unaware of an ADAS feature. A recommendation can also occur because the system determined that the driver is likely to accept the prompt. Each ADAS feature to be recommended can be associated with one or more prompts that can be displayed to the driver. For example, a prompt can be designated for cruise control on an open highway and a separate prompt can be designated for cruise control during inclement weather. As another example, a prompt can be associated with beeping when a driver makes a dangerous left turn across traffic. A second prompt can be associated when the left turn is instead associated with an illegal U-turn. As the driver responds to the prompts, the system can continue to be trained to adopt to the specific driver's needs. If multiple drivers use the vehicle, separate models can be maintained for each driver, and each prompt will train the specific model.

Figure 5:
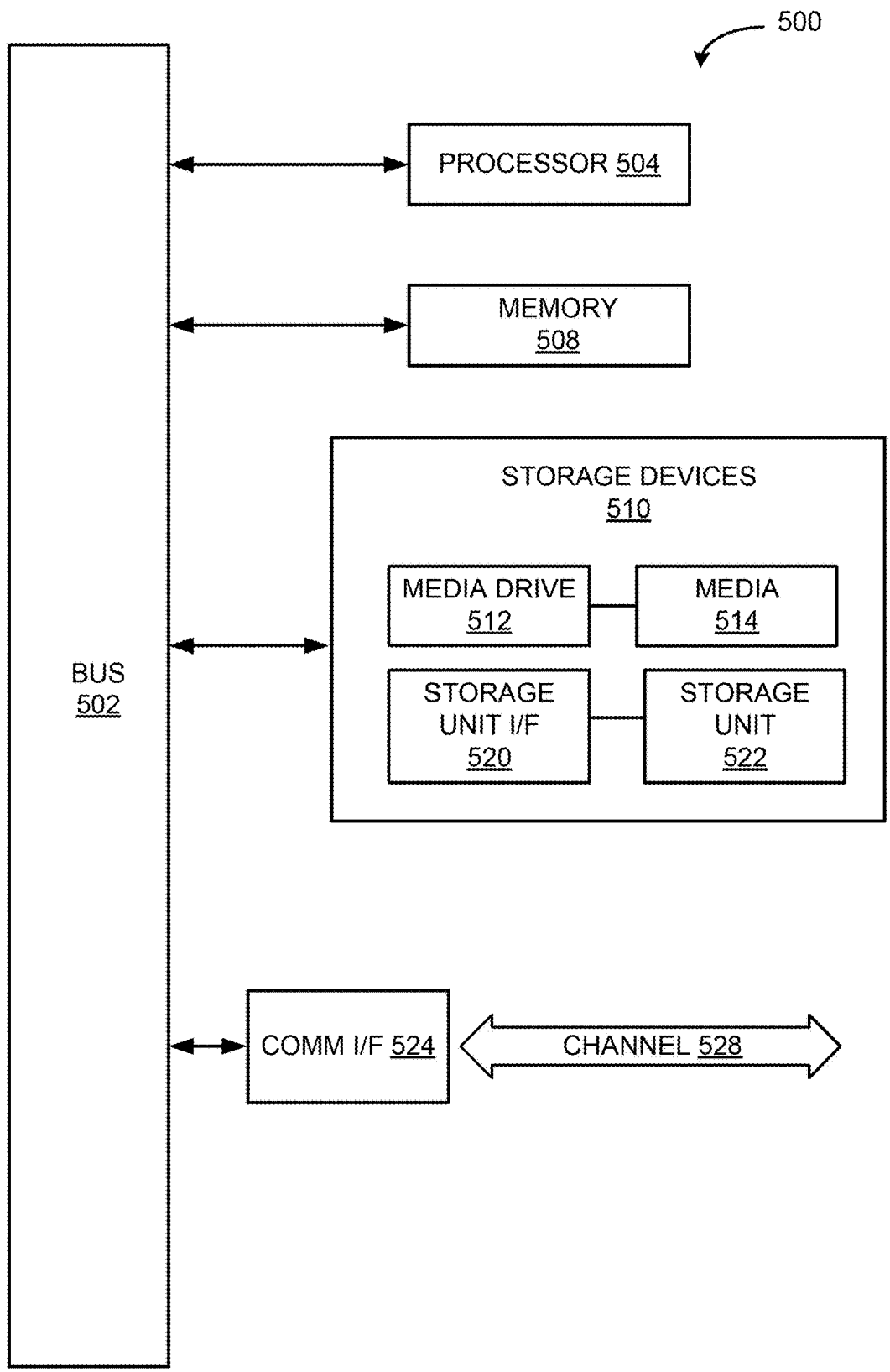
FIG. 5 is an example computing component that may be used to implement various features of embodiments described in the present disclosure.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAS, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 5. Various embodiments are described in terms of this example-computing component 500. After reading this description, it will become apparent to a person skilled in the relevant art how to implement the application using other computing components or architectures.

Referring now to FIG. 5, computing component 500 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 500 might also represent computing capabilities embedded within or otherwise available to a given device. For example, a computing component might be found in other electronic devices such as, for example, portable computing devices, and other electronic devices that might include some form of processing capability.

Computing component 500 might include, for example, one or more processors, controllers, control components, or other processing devices. This can include a processor 504. Processor 504 might be implemented using a general-purpose or special-purpose processing engine such as, for example, a microprocessor, controller, or other control logic. Processor 504 may be connected to a bus 502. However, any communication medium can be used to facilitate interaction with other components of computing component 500 or to communicate externally.

Computing component 500 might also include one or more memory components, simply referred to herein as main memory 508. For example, random access memory (RAM) or other dynamic memory, might be used for storing information and instructions to be executed by processor 504. Main memory 508 might also be used for storing temporary variables or other intermediate information during execution of instructions to be executed by processor 504. Computing component 500 might likewise include a read only memory ("ROM") or other static storage device coupled to bus 502 for storing static information and instructions for processor 504.

The computing component 500 might also include one or more various forms of information storage mechanism 510, which might include, for example, a media drive 512 and a storage unit interface 520. The media drive 512 might include a drive or other mechanism to support fixed or removable storage media 514. For example, a hard disk drive, a solid-state drive, a magnetic tape drive, an optical drive, a compact disc (CD) or digital video disc (DVD) drive (R or RW), or other removable or fixed media drive might be provided. Storage media 514 might include, for example, a hard disk, an integrated circuit assembly, magnetic tape, cartridge, optical disk, a CD or DVD. Storage media 514 may be any other fixed or removable medium that is read by, written to or accessed by media drive 512. As these examples illustrate, the storage media 514 can include a computer usable storage medium having stored therein computer software or data.

In alternative embodiments, information storage mechanism 510 might include other similar instrumentalities for allowing computer programs or other instructions or data to be loaded into computing component 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory component) and memory slot. Other examples may include a PCMCIA slot and card, and other fixed or removable storage units 522 and interfaces 520 that allow software and data to be transferred from storage unit 522 to computing component 500.

Computing component 500 might also include a communications interface 524. Communications interface 524 might be used to allow software and data to be transferred between computing component 500 and external devices. Examples of communications interface 524 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 524 may be carried on signals, which can be electronic, electromagnetic (which includes optical) or other signals capable of being exchanged by a given communications interface 524. These signals might be provided to communications interface 524 via a channel 528. Channel 528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 508, storage unit 520, media 514, and channel 528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 500 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method for effectuating an advanced driver-assistance system (ADAS) of a vehicle comprising:
obtaining sensor data from one or more sensors;
retrieving data regarding a user's past interactions with the ADAS;
determining the user's behavior based on the sensor data and the data regarding the user's past interactions, the user's past interactions comprising information on turn on operations of the ADAS and turn off operations of the ADAS; and
adjusting operation of the ADAS in response to the user's behavior.

2. The method of claim 1, further comprising determining whether the user is unaware of the existence of an ADAS feature based on the user's behavior and recommending the ADAS feature to the user when the user is determined to be unaware.

3. The method of claim 1, wherein adjusting the ADAS comprises determining whether an ADAS feature is applicable to a situation and recommending the ADAS feature to the user upon determining that the ADAS feature is applicable.

4. The method of claim 3, wherein recommending the ADAS feature includes providing a prompt to initiate the ADAS feature and initiating the ADAS feature upon receiving a user response accepting the prompt.

5. The method of claim 4, wherein providing the prompt is completed with a LED display and the LED display provides a shortcut to turn on the recommended ADAS feature.

6. The method of claim 1, further comprising determining when the user turned off an ADAS feature; determining whether the ADAS feature was subsequently updated; and notifying the user about the updated ADAS feature.

7. The method of claim 1, wherein the user behavior reflects the past interactions of a first user, and further comprising sharing the user behavior with a second user.

8. The method of claim 1, wherein the sensor data includes the user's facial and physical expressions.

9. The method of claim 1, wherein the past user interaction data includes previous recommendations on ADAS features that the user ignored.

10. The method of claim 1, wherein the past user interaction data includes the number of times an ADAS feature was turned off.

11. The method of claim 1, wherein the sensor data is pooled with the past interaction data to correlate the driver's behavior to a particular event.

12. The method of claim 1, further comprising determining a predicted behavior based on the user's past interactions and adjusting operation of the ADAS based on the predicted behavior.

13. A vehicle, comprising:
a processor;
a plurality of sensors; and
a memory unit operatively connected to the processor and including computer code, that when executed, causes the processor to:
obtain sensor data from the plurality of sensors;
retrieve data on a user's past interactions;
determine the user's behavior based on the sensor data and data on past user interactions, the user's past interactions comprising information on turn on operations of the ADAS and turn off operations of the ADAS;
determine whether the user is unaware of an ADAS feature;
recommend the ADAS feature to the user on a display by presenting, on the display, a prompt to initiate the ADAS feature; and
adjust operation of the ADAS according to the user's response.

14. The vehicle of claim 13, wherein the prompt is a textual message and further comprises an actuation mechanism to initiate the ADAS feature and an actuation mechanism to ignore the prompt.

15. The vehicle of claim 13, wherein the memory unit includes computer code, that when executed, further causes the processor to determine whether an ADAS feature is applicable to a situation.

16. The vehicle of claim 13, wherein the user's behavior reflects the past interactions of a first user, and wherein the memory unit includes computer code, that when executed, further causes the processor to share the user behavior with a second user.

17. The vehicle of claim 13, wherein the past user interaction data includes previous recommendations on ADAS features that the user ignored and wherein the memory unit includes computer code, that when executed, further causes the processor to abstain from recommending an ADAS feature if the user previously ignored a recommendation.

18. The vehicle of claim 13, wherein the past user interaction data includes the number of times an ADAS feature was turned off and wherein the memory unit includes computer code, that when executed, further causes the processor to abstain from recommending an ADAS feature if the ADAS feature was turned off one or more times.

19. The vehicle of claim 13, wherein the one or more sensors includes at least one of an eye tracking sensor, speed sensor, facial recognition sensor, and environmental sensor.

20. The vehicle of claim 13, wherein the display is a LED display.

21. A method for effectuating an advanced driver-assistance system (ADAS) of a vehicle comprising:
obtaining sensor data from one or more sensors;
retrieving data regarding a user's past interactions with the ADAS;
determining the user's behavior based on the sensor data and the data regarding the user's past interactions, the user's past interactions comprising the number of times an ADAS feature was turned off; and
adjusting operation of the ADAS in response to the user's behavior.

22. The method of claim 21, further comprising determining whether the user is unaware of the existence of an ADAS feature based on the user's behavior and recommending the ADAS feature to the user when the user is determined to be unaware.

23. The method of claim 21, wherein adjusting the ADAS comprises determining whether an ADAS feature is applicable to a situation and recommending the ADAS feature to the user upon determining that the ADAS feature is applicable.

24. The method of claim 23, wherein recommending the ADAS feature includes providing a prompt to initiate the ADAS feature and initiating the ADAS feature upon receiving a user response accepting the prompt.

25. The method of claim 24, wherein providing the prompt is completed with a LED display and the LED display provides a shortcut to turn on the recommended ADAS feature.

26. The method of claim 21, wherein the user's past interactions comprise information on turn on operations of the ADAS and turn off operations of the ADAS.

27. The method of claim 21, further comprising determining when the user turned off an ADAS feature; determining whether the ADAS feature was subsequently updated; and notifying the user about the updated ADAS feature.

28. The method of claim 21, wherein the user behavior reflects the past interactions of a first user, and further comprising sharing the user behavior with a second user.

29. The method of claim 21, wherein the sensor data includes the user's facial and physical expressions.

30. The method of claim 21, wherein the past user interaction data includes previous recommendations on ADAS features that the user ignored.

31. The method of claim 21, wherein the sensor data is pooled with the past interaction data to correlate the driver's behavior to a particular event.

32. The method of claim 21, further comprising determining a predicted behavior based on the user's past interactions and adjusting operation of the ADAS based on the predicted behavior.

* * * * *